Jan. 16, 1968  D. W. GREEN ETAL  3,363,744
CONVEYOR APPARATUS
Filed Sept. 21, 1965  9 Sheets-Sheet 1

INVENTORS
Donald W. Green
Douglas M. Kerr
BY
ATTORNEYS

Jan. 16, 1968     D. W. GREEN ETAL     3,363,744
CONVEYOR APPARATUS
Filed Sept. 21, 1965     9 Sheets-Sheet 2
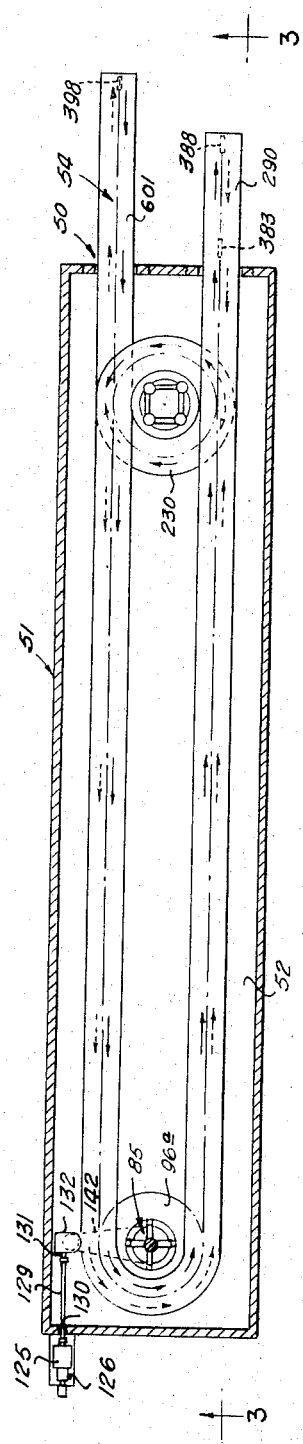
Fig. 2
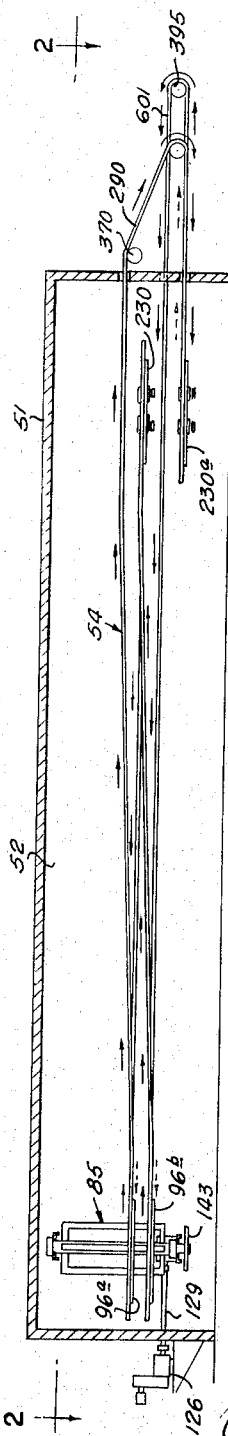
Fig. 3
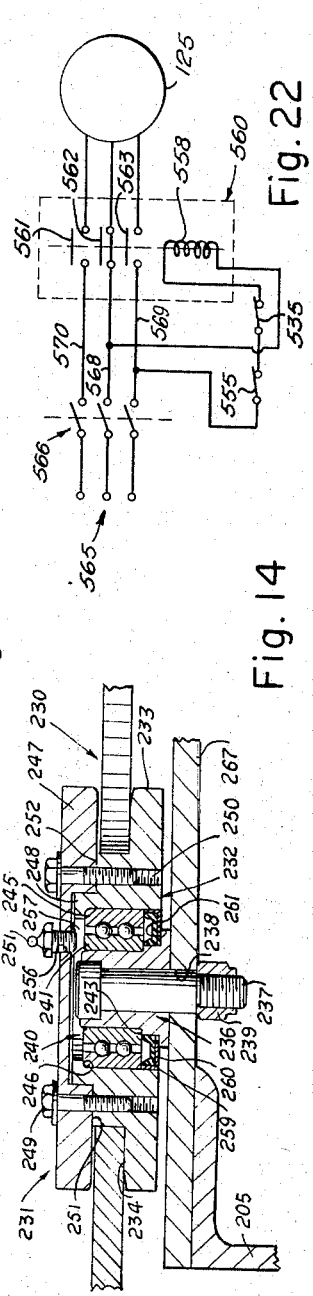
Fig. 22
Fig. 14
INVENTORS
Donald W. Green
Douglas M. Kerr
BY
ATTORNEYS INVENTORS
Donald W. Green
Douglas M. Kerr

BY
ATTORNEYS

Jan. 16, 1968  D. W. GREEN ETAL  3,363,744
CONVEYOR APPARATUS
Filed Sept. 21, 1965  9 Sheets-Sheet 4
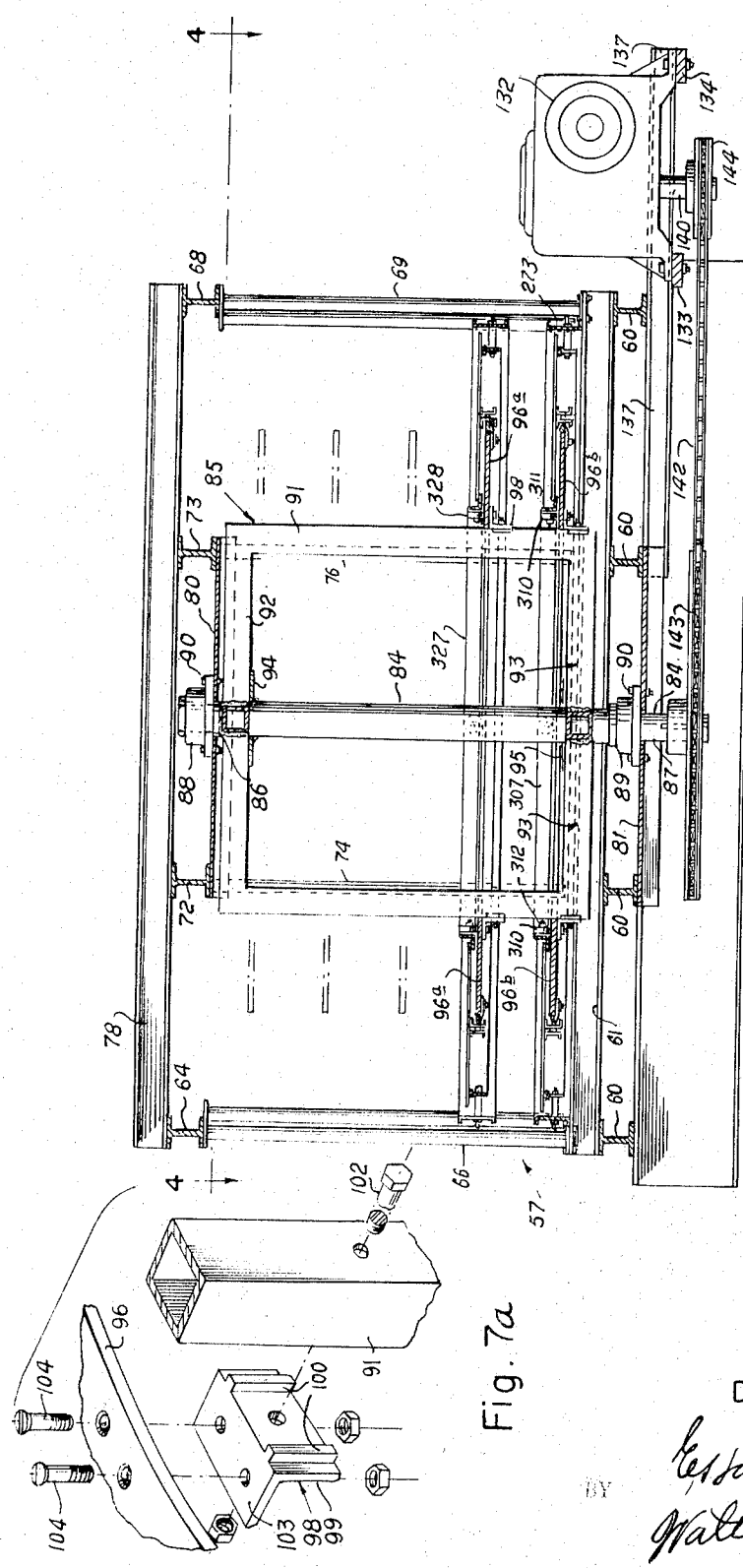
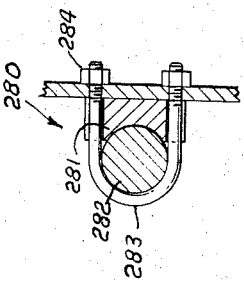
Fig.15
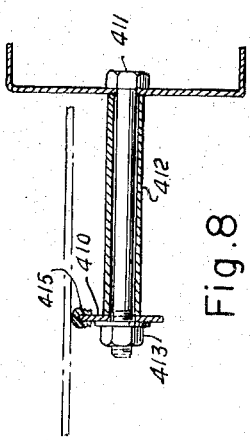
Fig.5
Fig.8
INVENTORS
Donald W. Green
Douglas M. Kerr
BY
ATTORNEYS Jan. 16, 1968  D. W. GREEN ETAL  3,363,744
CONVEYOR APPARATUS Filed Sept. 21, 1965  9 Sheets-Sheet 5

INVENTORS
Donald W. Green
Douglas M. Kerr

BY *Hastings Ackley
and
Walter J. Jay*

ATTORNEYS

Jan. 16, 1968 D. W. GREEN ETAL 3,363,744
CONVEYOR APPARATUS
Filed Sept. 21, 1965 9 Sheets-Sheet 6

INVENTORS
Donald W. Green
Douglas M. Kerr
BY
ATTORNEYS

Jan. 16, 1968   D. W. GREEN ET AL   3,363,744
CONVEYOR APPARATUS
Filed Sept. 21, 1965   9 Sheets-Sheet 8

INVENTORS
Donald W. Green
Douglas M. Kerr
BY
ATTORNEYS

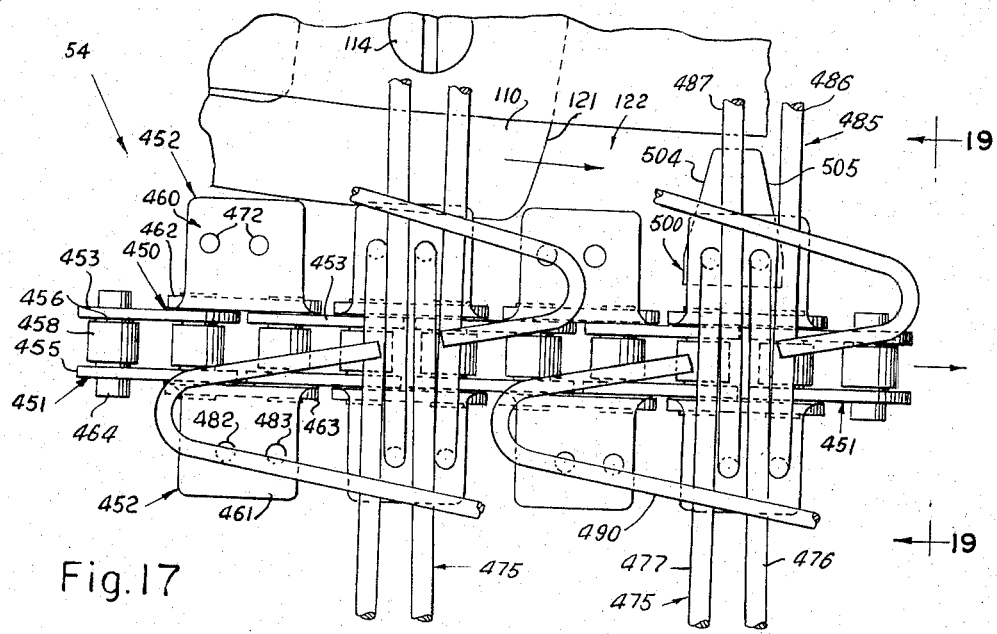
Fig. 17
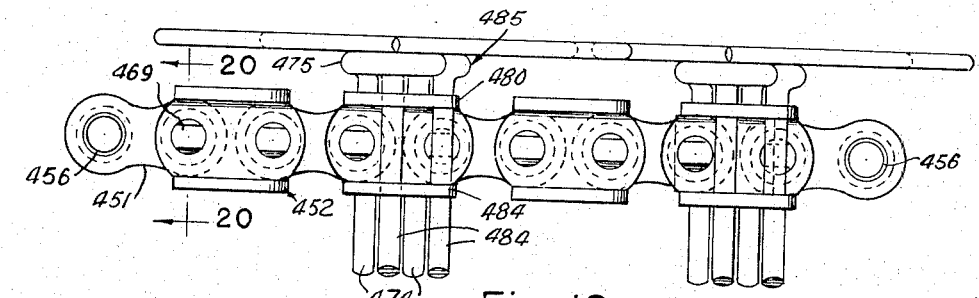
Fig. 18
Fig. 20
Fig. 19
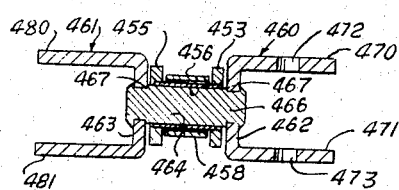
Fig. 21
INVENTORS
Donald W. Green
Douglas M. Kerr
ATTORNEYS

United States Patent Office 3,363,744
Patented Jan. 16, 1968

3,363,744
CONVEYOR APPARATUS
Donald W. Green and Douglas M. Kerr, Richardson, Tex., assignors to Stewart Engineering & Equipment Company, Inc., Richardson, Tex., a corporation of Texas
Filed Sept. 21, 1965, Ser. No. 488,894
19 Claims. (Cl. 198—136)

This invention relates to conveyor apparatus and more particularly to a conveyor apparatus having a conveyor movable through a plurality of vertically spaced loops.

An object of the invention is to provide a new and improved conveyor apparatus having a conveyor providing support means which are adapted to support objects thereon while contacting only small portions of the bottom surfaces of such objects.

Another object is to provide a conveyor apparatus whose conveyor is arranged for travel in a continuous path about a plurality of vertically spaced loops.

Still another object is to provide a conveyor apparatus whose conveyor is arranged in loops having spaced arcuate end sections connected by straight sections, wherein the apparatus has drive means at one end of each of the loops engaging the end section for moving the conveyor and changing the direction of its movement and tensioning means at the other end of each of the loops engaging the other end section thereof for mounting the loops under predetermined tension and for changing the direction of movement of the conveyor.

A further object is to provide a conveyor apparatus wherein the drive and tensioning means comprise rotatable sprockets rings having peripheral spaced lugs engageable with the conveyor.

A still further object of the invention is to provide a conveyor apparatus wherein the curvature of the arcuate end sections of the loops of the conveyor about their vertical axes is very great to accommodate the relative width of the conveyor and prevent excessive movement of outer and inner portions of the conveyor.

Another object is to provide a new and improved conveyor for use in a conveyor apparatus which is movable about both vertical and horizontal axes.

Still another object is to provide a conveyor with a central endless draw member formed of a plurality of interconnected link assemblies movable relative to each other about mutually perpendicular axes.

Still another object is to provide a conveyor wherein at least certain of the link assemblies are provided with laterally outwardly extending support means for supporting articles to be carried by the conveyor.

A further object is to provide a conveyor wherein the support means have support rods which extend laterally outwardly from the draw member and which are provided with convoluted support members on their upper surfaces whose convolutions extend in opposite directions from the support rods in the direction of movement of the conveyor, the convolutions of the support members of adjacent support rods intermeshing to provide support surfaces for objects which have relatively small spaces therebetween.

A further object is to provide a conveyor whose draw member has link assemblies providing spaced horizontal flanges between which the lugs of the sprocket rings are receivable to support and guide the end sections of the loops of the conveyor.

A still further object is to provide a conveyor wherein longitudinally spaced link assemblies of its draw member are provided with drive lugs engageable with the sprocket lugs.

Another object is to provide a conveyor apparatus having a support frame for supporting a conveyor for movement in a plurality of vertically spaced loops.

Another object is to provide a conveyor apparatus wherein the support frame includes a rear frame assembly rotatably supporting drive frame on which sprocket rings are mounted whose lugs are engageable with the rear arcuate end sections of the loops of the conveyor and with a front frame assembly on which movable carriages are mounted each having a sprocket ring rotatably mounted thereon and each yieldably biased to maintain the conveyor whose forward arcuate end sections are engaged by the lugs of the sprocket rings mounted on the carriages.

Still another object is to provide a conveyor apparatus wherein only one drive lug of the conveyor at any one time is engaged with a lug of each sprocket ring.

Additional objects and advantages of the invention will be readily apparent from the reading of the following description of a device constructed in accordance with the invention, and reference to the accompanying drawings thereof, wherein:

FIGURE 2 is a schematic sectional view of the conveyor apparatus and the housing taken on line 2—2 of FIGURE 3;

FIGURE 3 is a schematic sectional view taken on line 3—3 of FIGURE 2;

FIGURE 5 is a vertical sectional view taken on line 5—5 of FIGURE 4;

FIGURES 7 and 7a are fragmentary exploded views of an upper and lower sprocket ring and lug which is attached thereto;

FIGURE 8 is a fragmentary sectional view taken on line 8—8 of FIGURE 4;

FIGURE 14 is a perspective fragmentary sectional view taken in line 14—14 of FIGURE 10;

FIGURE 15 is a sectional view of a typical clamp assembly of the support frame;

FIGURE 17 is an enlarged fragmentary sectional view of the conveyor and a drive sprocket ring of the drive frame;

FIGURE 18 is a fragmentary side view of the conveyor shown in FIGURE 17;

FIGURE 19 is a fragmentary view taken on line 19—19 of FIGURE 17;

FIGURE 20 is a fragmentary sectional view taken on line 20—20 of FIGURE 18;

FIGURE 21 is a fragmentary sectional view taken on line 21—21 of FIGURE 1; and,

FIGURE 22 is a schematic diagram of the electrical circuit for controlling the operation of the conveyor apparatus.

Figure 1:
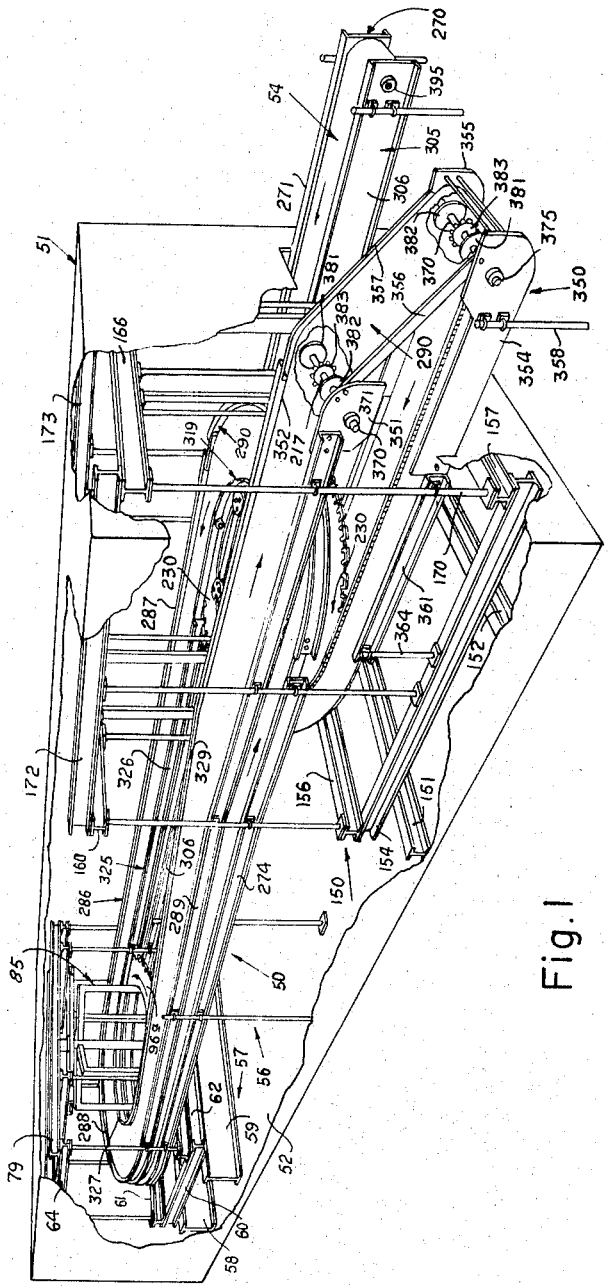
FIGURE 1 is a perspective partly schematic view, some parts broken away, of a conveyor apparatus embodying the invention showing the conveyor in use for carrying objects through a housing in which predetermined temperature or other conditions may be maintained to which the objects are to be subjected.
Figure 4:
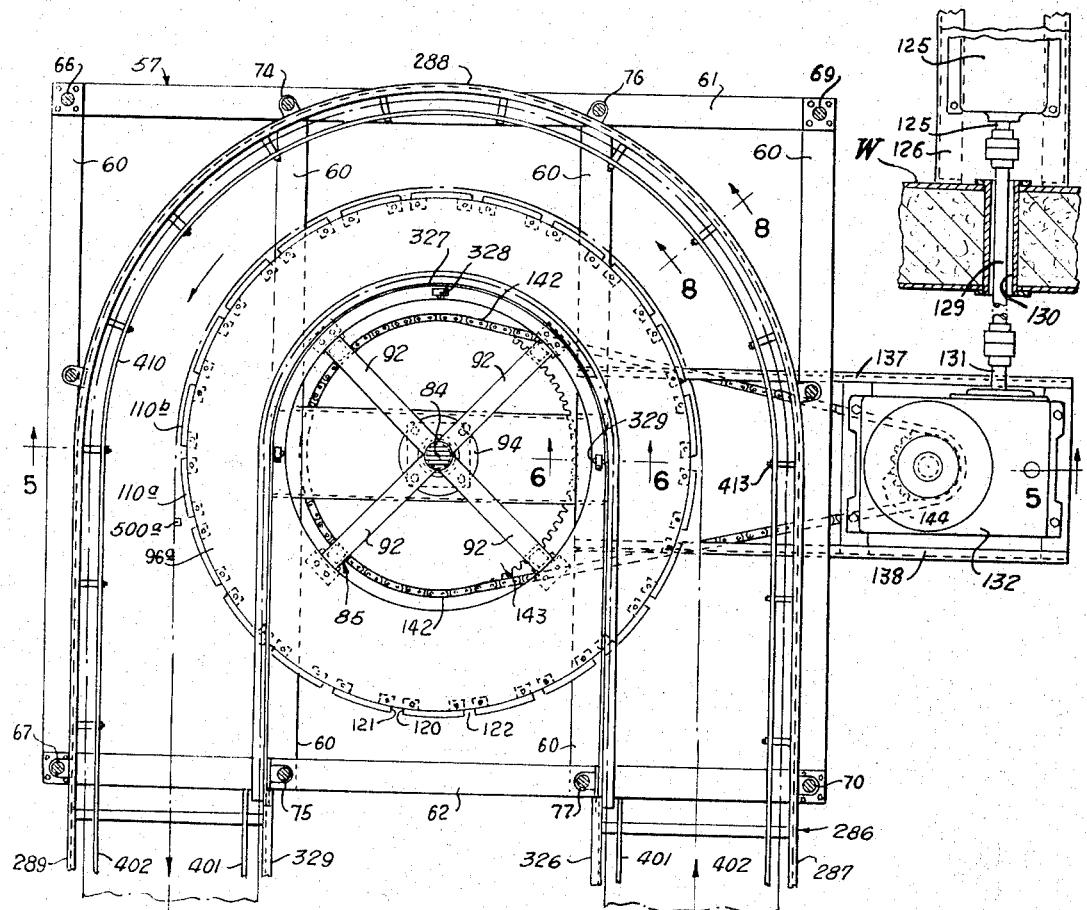
FIGURE 4 is a fragmentary sectional view of the rear frame assembly of the conveyor apparatus with the conveyor shown schematically taken on line 4—4 of FIGURE 5.
Figure 6:
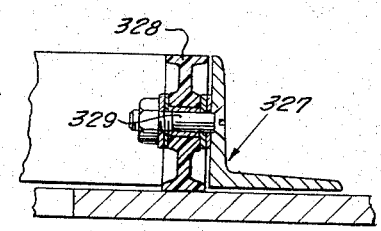
FIGURE 6 is a fragmentary sectional view taken on line 6—6 of FIGURE 4.
Figure 7:
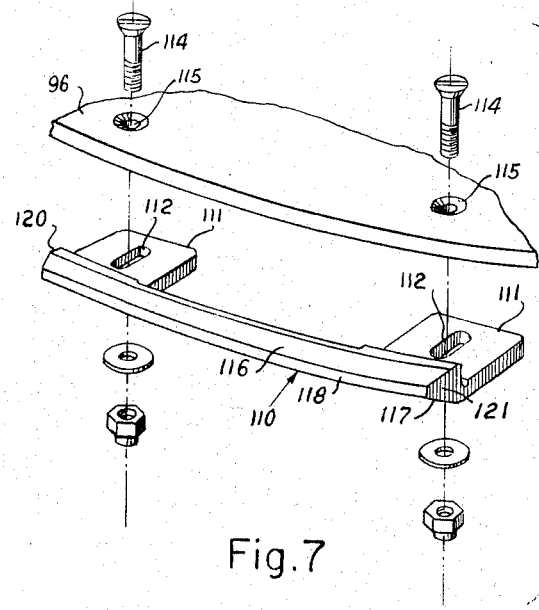
Figure 9:
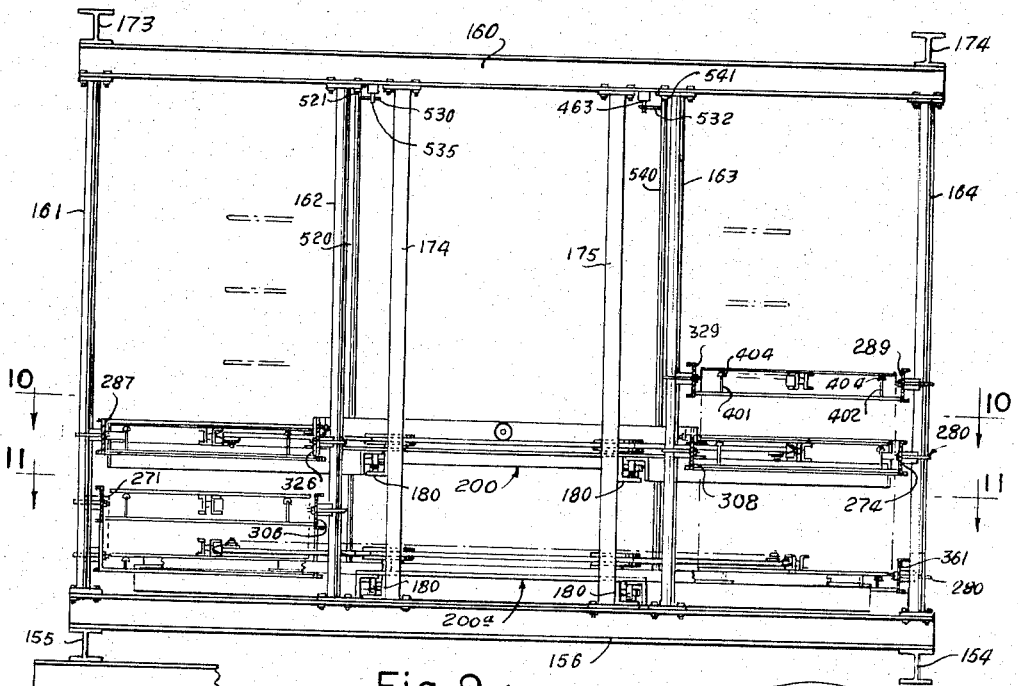
FIGURE 9 is a vertical view of the front frame assembly taken on line 9—9 of FIGURE 10.
Figure 13:
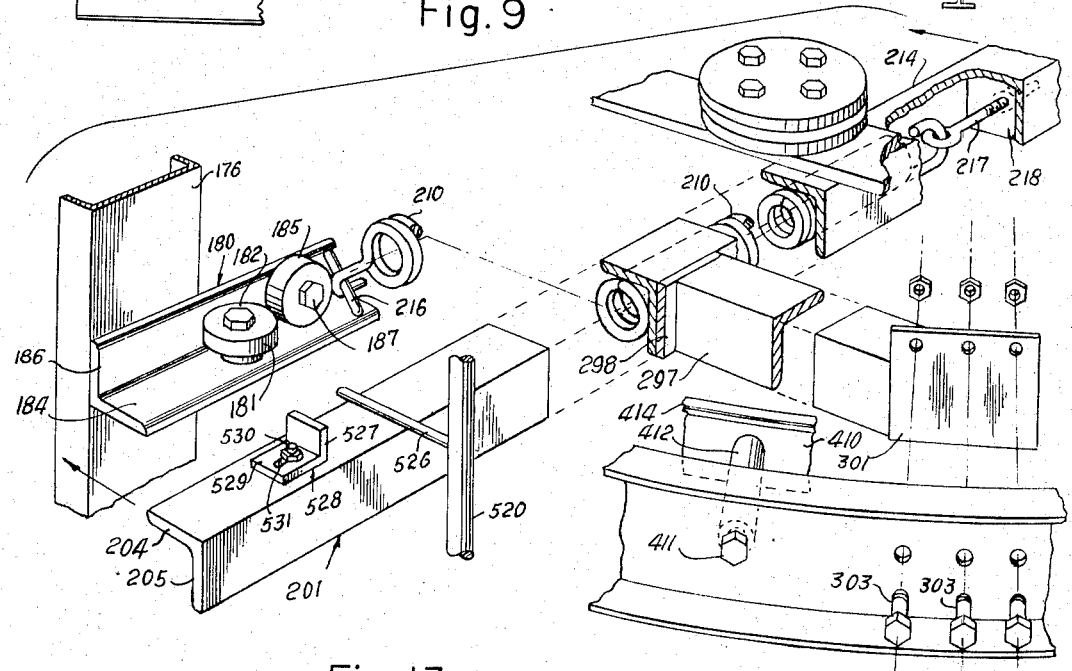
FIGURE 13 is a fragmentary perspective exploded view, with some parts broken away, of a movable carriage of the apparatus showing the means for mounting it on the front frame assembly.

Referring now to the drawings, the conveyor apparatus 50 embodying the invention may be employed to move articles in a predetermined path during a predetermined period of time. For example, it may be desired to move food products through a freezing chamber or an oven in order that the food products be frozen or baked or it may be desired to cool the food products after they have been heated. The conveyor apparatus is illustrated as used with a housing 51 which provides a chamber 52 in which desired temperature or other conditions may be maintained in order that the objects or articles carried by the conveyor 54 of the apparatus be subjected to such predetermined conditions for a predetermined period of time. For example, the chamber 52 may be maintained at very low temperatures if the objects to be carried are, for example, meat patties or food products which are to be quick frozen in the chamber. The conveyor is supported for movement in two vertically aligned loops in the chamber by a support frame 56 which includes a rear support assembly 57 having a pair of transversely extending base beams 58 and 59 which are rigidly secured to the floor of the housing, a plurality of transversely spaced longitudinally extending spacer beams 60 which rest on the base beams and are rigidly secured thereto in any suitable manner, as by welding, and a pair of transverse bottom support beams 61 and 62 which in turn rest on and are rigidly secured to the spacer beams. The rear frame assembly includes an outer top longitudinally extending support beam 64 which is secured to the bottom support beams 61 and 62 by rear and front posts 66 and 67 provided with suitable end plates which are secured to the top and bottom support beams in any suitable manner, as by bolts. The other outer top longitudinally extending beam 68 of the rear frame assembly similarly is supported on the bottom support beams by rear and front vertical posts 69 and 70. The inner top support beams 72 and 73 are similarly supported on the bottom support beams, the inner upper beam 72 being supported by the rear and front posts 74 and 75 and the inner support beam 73 being supported by the rear and front posts 76 and 77. A pair of transversely extending longitudinal reinforcing beams 78 and 79 extend over the top support beams 64, 68, 72 and 73 and are rigidly secured thereto in any suitable manner, as by welding. The web of a top support plate 80 is rigidly secured, as by welding, to the inner top support beams 72 and 73 of the rear frame assembly and the web of a similar bottom support plate 81 is similarly secured to the inner pair of spacer beams 60.

The vertical shaft 84 of a rotatable drive frame 85 is rotatably supported on the support plates 80 and 81, through whose aligned vertical apertures 86 and 87 its reduced upper and lower end portions extend, by means of the top and bottom bearing assemblies 88 and 89, respectively. The bearing assemblies are rigidly secured to the support plates by means of bolts 90 which extend through suitable apertures in the flanges of the bearings and support plates. The drive frame has a plurality of vertical members 91 which are spaced radially outwardly of the shaft 84 and rigidly secured thereto by upper and lower horizontal connector members 92 and 93. The bottom surfaces of the upper horizontal connector members abut an upper support ring 94 rigidly secured to the post, as by welding, the connector members being secured to both the shaft and the support ring by welding. The lower connector members 93 similarly have upper surfaces which abut the lower support ring 95 of the shaft and are also rigidly secured to the shaft and to the lower support plate by welding. The vertical drive frame members 91 and their connector members may be formed of tubular members which are rectangular in cross-section.

Upper and lower sprocket rings 96a and 96b are secured to the vertical members 91 of the drive frame by support brackets 98 each of which has a vertical flange 99 provided with spaced ribs 100 which extend on opposite sides of a vertical member 91 when the vertical flange is secured to the vertical member by means of a bolt 102 which extends through aligned apertures in the vertical member and the vertical flange. The upper and lower sprocket rings rest on the upper horizontal flanges 103 of the upper and lower support brackets on the vertical members of the drive frame and are rigidly secured thereto by means of bolts 104 which extend through suitable aligned apertures in the sprocket rings and the horizontal flanges of the support brackets.

Each of the sprocket rings has a plurality of sprocket lugs 110 secured thereto in circumferentially spaced relationship about its outer peripheral edge. Each of the sprocket lugs is provided with a pair of inwardly extending ears 111 having radial slots 112 through which extend the bolts 114 which secure the ears to the sprocket ring. The bolts, of course, also extend through the bores or apertures 115 of the sprocket rings. The provision of the slots permits radial adjustment of the sprocket lugs on the sprocket rings. The sprocket lugs, which are in the form of segments of a circle, are provided with upper and lower shoulders 116 and 117 which converge outwardly to the vertical outer peripheral surface 118 and with outwardly convergent vertical end surfaces 120 and 121 so that the slots 122 defined by the adjacent end surfaces 120 and 121 of adjacent sprocket lugs increase in width outwardly. The drive frame 85, and therefore, the sprocket rings which are secured thereto, is rotated by a suitable prime mover, such as an electric motor 125 which is preferably located exteriorly of the housing 51 and may be mounted on a suitable platform or base 126 rigidly secured to the wall of such housing. The drive shaft 128 of the motor is connected by a suitable connector shaft 129, which extends through a suitable aperture or passage 130 in the wall of the housing, to the input shaft 131 of a speed reducing device or transmission 132. The speed reducing device is mounted on longitudinally extending support bars 133 and 134 which extend between and are rigidly secured, as by welding, to a pair of transversely extending angle members 137 and 138 of the rear frame assembly which in turn are rigidly secured, as by welding, to the spacer bars 60. The output shaft 140 of the speed reducing transmission and the shaft 84 of the drive frame 85 are connected by a chain 142 which extends about the sprockets 143 and 144 rigidly secured to the drive frame shaft 84 and the output shaft 140, respectively.

The support frame 56 of the conveyor apparatus also includes a front frame assembly 150 which has a pair of transversely extending parallel spaced base beams 151 and 152 rigidly secured to the floor of the housing 51 in any suitable manner, a pair of longitudinally extending transversely spaced spacer beams 154 and 155 rigidly secured to the base beams and a pair of parallel transversely extending bottom support beams 156 and 157 which rest upon and are rigidly secured to the spacer beams. The front frame assembly includes a rear top support beam 160 supported on the rear bottom support beam 156 by means of four posts 161, 162, 163 and 164 whose end plates are rigidly secured to the rear top and bottom support beams in any suitable manner, as by bolts. The front top support beam 166 of the front frame assembly is similarly rigidly mounted on the front bottom support beam 157 by means of the posts 167, 168, 169 and 170. The top beams of the front frame assembly are connected to a pair of reinforcing beams 172 and 173 which extend thereover.

A pair of rear vertical channel members 174 and 175 extend between the rear bottom and top support beams 156 and 160 and are secured thereto by means of suitable bolts which extend through suitable apertures, their end plates and the flanges of the beams. A similar pair of aligned channel members 176 and 177 extend between the front bottom and top support beams 157 and 166 and are similarly secured thereto. The vertical channel members each carry two or more vertically spaced support brackets 180. Each of the support brackets has a roller 181 mounted on a bolt 182 secured to its horizontal flange 184 for rotation about a vertical axis and a roller 185 mounted on its vertical flange 186 for rotation about a horizontal axis by means of a bolt 187. The vertical flanges are secured to the channel members by welding.

The upper carriage 200 is supported on the rollers 185 of the upper support brackets 180 mounted on the four channel members 172, 173, 174 and 175. The upper carriage includes a pair of longitudinal axle members 201 and 202 which extend on opposite sides of the front and rear vertical channel members and whose horizontal flanges 204 rest upon the rollers 185 of the upper support brackets and whose vertical flanges 205 are engageable with the rollers 181 thereof. The rollers 181 guide the longitudinal movement of the upper carriage 200 relative to the front frame assembly. The carriage includes transverse bars 206 and 207 and a pair of angle members 208 and 209 which are rigidly secured to the longitudinal angle members. The upper carriage is biased forwardly by a pair of springs 210 and 211. The spring 210 is positioned below the horizontal flange 204 of the longitudinal angle member 201 and its front end portion is hooked about a pin 216 mounted on a support bracket 180 secured to the front channel member 176. The rear end portion of the spring is hooked through the eye of an eye-bolt 217 which extends through an aperture in a plate 218 rigidly secured to the longitudinal angle member 201 and is held against forward movement relative thereto by a nut 219 threaded on the eye-bolt. The spring 211 similarly has a forward end portion which extends about a pin 220 rigidly secured to the front support bracket 180 which is mounted on the front channel member 177 and its rear hook end portion is hooked through an eye of an eye-bolt 221 which extends through a suitable aperture in a plate 222 rigidly secured to the other longitudinal member 202 and held against movement by the nut 223 threaded thereon.

Figure 10:
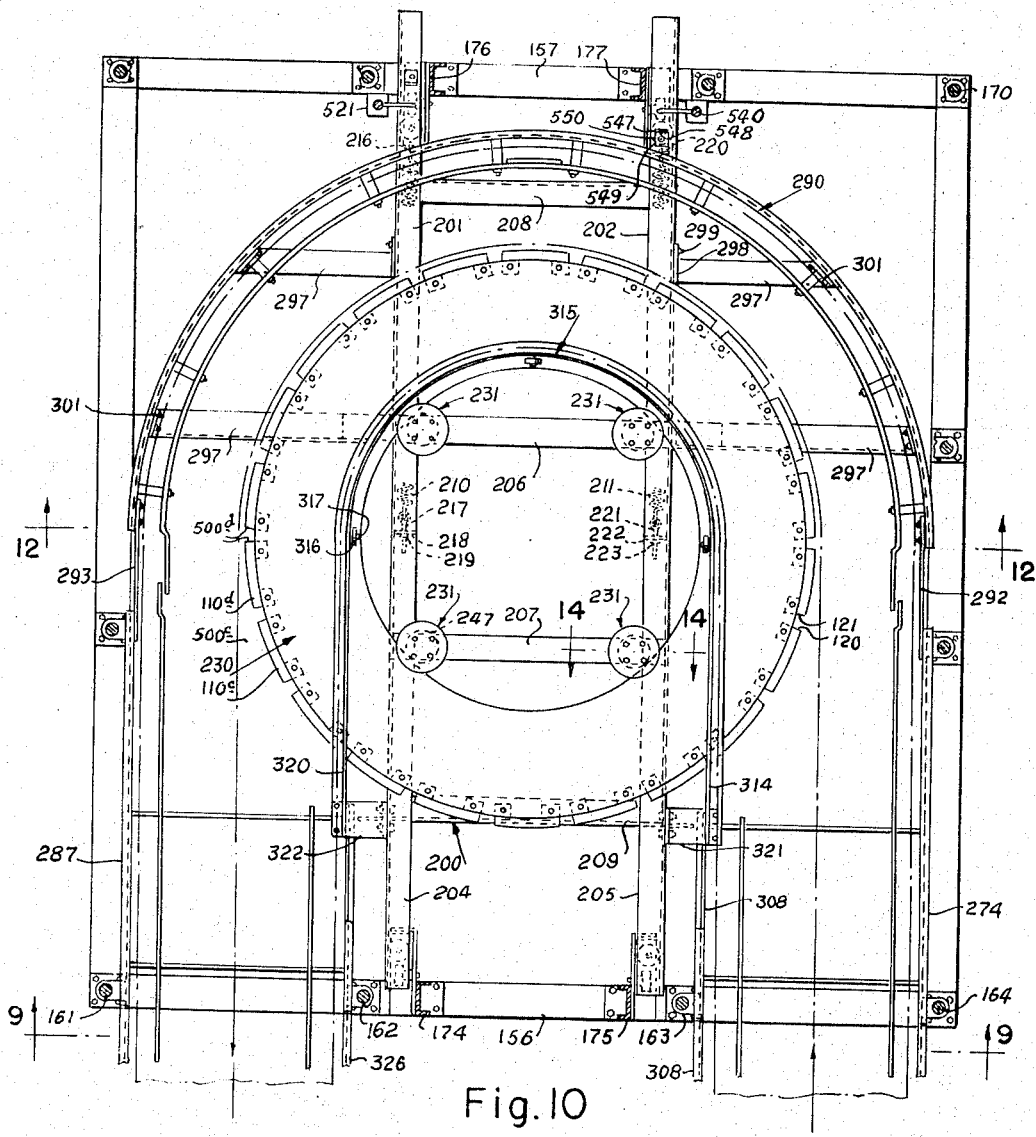
FIGURE 10 is a horizontal sectional view with some parts removed and with the conveyor shown schematically taken on line 10—10 of FIGURE 9.
Figure 12:
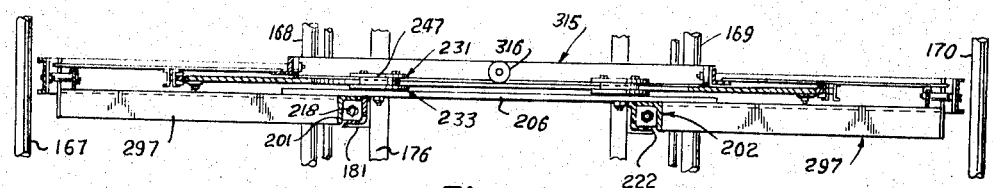
FIGURE 12 is a fragmentary sectional view taken on line 12—12 of FIGURE 10.
Figure 11:
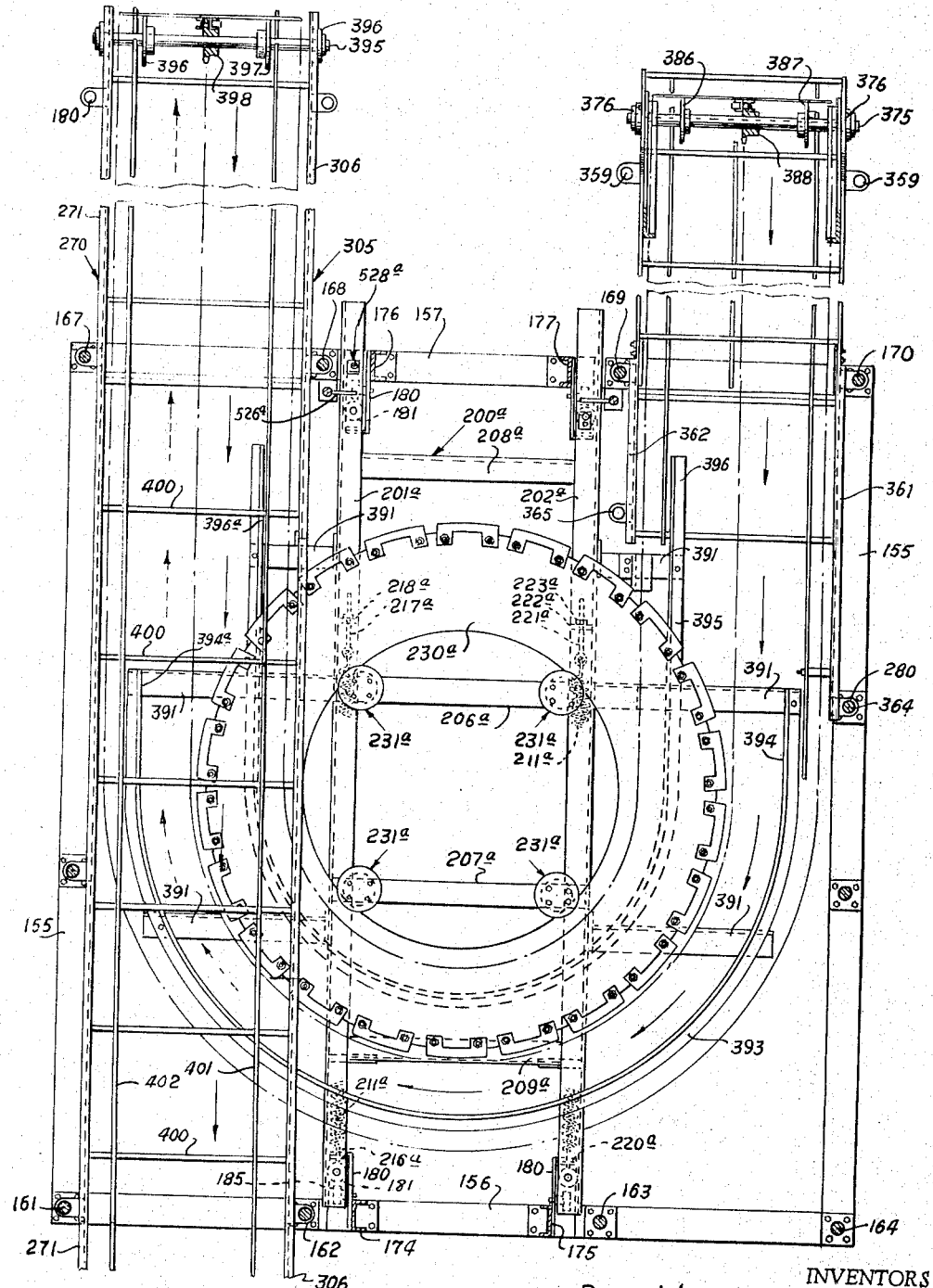
FIGURE 11 is a sectional view taken on line 11—11 of FIGURE 9.

A sprocket ring 230 is mounted on the carriage for rotation about a vertical axis by means of four bearing assemblies 231 which are mounted on the transverse bars 206 and 207 of the carriage. Each of the bearing assemblies includes a support member 232 having an external flange 233 which provides an annular shoulder or surface 234 on which the sprocket ring is supported. Each support member is rotatably mounted on a central tubular member or post 236 which is rigidly secured to the transverse bar by means of a bolt 237 which extends through the tubular member and a suitable aperture 238 of the transverse bar and is secured thereto by a nut 239. The support member 232 is rotatably mounted on its post 236 by means of a bearing assembly 240 which includes an inner annular race 241 telescoped over the upper reduced portion of the post, its downward movement thereon being limited by the engagement of its bottom surface with the upwardly facing annular shoulder 243 of the post. The support member 232 is telescoped over the outer race 245 of the bearing assembly and its downward movement thereon is limited by the engagement of its internal annular downwardly facing soulder 246 with the top surface of the outer race. The retainer plate 247 extends over the upper reduced portion 248 of the support member 233, and is rigidly secured to the support member by bolts 249 which extend through suitable apertures of the retainer plate into threaded bores 250 of the support member. Downward movement of the retainer plate on the support member is limited by the engagement of its bottom surface 251 with the upwardly facing shoulder 252 of the support member. The retainer plate extends outwardly over the shoulder 234 of the flange 233 and provides with the flange 233 an annular recess in which the inner portions of the sprocket ring 230 are received. The retainer plate is provided with a suitable fitting 255 threaded in an aperture 256 through which grease or oil may be supplied into the chamber 257 and to the bearing assembly 240. The bottom of the chamber 257 is closed by an annular seal 259 which is held against downward displacement by a retainer ring 260 which rests on the upwardly facing annular shoulder 261 of the post 236. It will be apparent that as the sprocket ring 230 is rotated in a counter-clockwise direction (FIGURE 10), the support members of the bearing assemblies 231 are rotated about the vertical axes of the support members and their posts 236 to facilitate such rotation of the sprocket ring.

The lower carriage 200a is similar in structure to the upper carriage 200 and, accordingly, its elements are provided with the same reference numerals, to which the subscript "a" has been added, as the corresponding elements of the carriage 200. The longitudinal members 201a and 202a of the lower carriage extend on opposite sides of the members 174 and 175 and 176 and 177, respectively, of the front frame assembly 150 and are supported on the rollers 185 of the lowermost support brackets mounted thereon. The longitudinal movement of the lower carriage is guided by the rollers 181 of these brackets which are mounted for rotation about vertical axes.

The lower carriage is biased in a rearward direction by a pair of springs 210a and 211a. The rear hook portion of the spring 210a extends about the pin 216a of the support bracket which is mounted on the rear vertical channel member 174 and its forward hook portion is engaged in the eye of the eye bolt 217a whose shank extends through a suitable aperture in the plate 218a secured to the longitudinal members 201a. The spring 211a similarly has its rear hook end extending about the pin 220a of the support bracket 180 which is secured to the rear vertical channel member 175 and its forward hooked end extending through the eye of the eye bolt 221a which extends through a suitable aperture in the plate 222a and is held against rearward movement by a nut 223a threaded on the stem of the eye bolt.

The lower sprocket ring 230a, which is also provided with sprocket lugs 110, is carried by the carriage and mounted for rotation thereon by means of the bearing assemblies 231a.

The support frame 56 of the apparatus includes a lower outer channel-shaped guide support 270 having a longitudinal section 171 which extends rearwardly from the front loading location of the conveyor, a rear arcuate section 273 which is aligned with the lower drive sprocket ring 96b and extends between the longitudinal side sections 271 and 274. The side section 274 extends forwardly from the rear section 273 to a position adjacent the lower idler sprocket ring 230a. The lower outer guide support is rigidly secured to the vertical support posts of the support frame 56 by means of clamp assemblies 280 each of which includes a spacer block 281 having a curved arcuate outer surface 282 and a U-bolt 283 whose threaded free end portions extend through suitable apertures in the web of the guide support and are rigidly secured thereto by means of nuts 284, the post being received between the bight portion of the U-bolt and the surface 282 of the spacer block 281.

An outer upper guide support 286 disposed above the lower guide support includes a side section 287, an arcuate rear section 288 aligned with the upper drive sprocket 96a and extending between the side sections 287 and 289. The side section 289 extends forwardly to the delivery location or point 290 of the conveyor apparatus. The upper guide support 286 is also secured to the posts of the support frame 256 by clamp assemblies 280. A movable front arcuate guide support section 290 which is aligned with the upper sprocket ring 230 is positioned forwardly of the two side sections 274 and 287 of the lower and upper outer guide supports and is provided with rearwardly extending bars 292 and 293 which extend slidably inwardly of the forward end portions of the side sections 274 and 287. The front arcuate guide section 290 is mounted on the upper carriage 200 by means of laterally outwardly extending transverse forward and rear transverse members 297, whose inner ends are provided with vertical end plates 298 which are rigidly secured to the vertical flanges of the longitudinal carriage members 201 and 202 by means of bolts 299. The outer end of each of the transverse members 297 has an outer end plate 301 welded thereto which extends at an angle to the transverse member 297 to abut the web of the guide support 290 and is rigidly secured thereto by means of bolts 303. The upper and lower guide supports 270 and 286 and the guide support section 290 thus form two vertically aligned and spaced loops between the loading and delivery locations of the conveyor.

The support frame 56 also includes a lower inner guide support 305, which is spaced inwardly of and at the same level as the lower outer guide support 270 and which includes a side section 306 which extends parallel to the side section 270, a curved rear section 307 which extends parallel to the curved section 273 and a side section 308 which extends parallel to the side section 274. The side sections 306 and 308 are rigidly secured by suitable clamp assemblies to the post of the support frame 56. The arcuate portion 307 is supported on the lower sprocket ring 96b by rollers 310 rotatably mounted on the vertical flange 311 of the guide support section 307 by means of bolts 312. The rollers 310 support the rear portions of the guide frame support section 307 on the lower sprocket ring 97b as the latter rotates. The forward portions of the arcuate end section 307 may be rigidly secured to the rear end portions of the inner support guide sections 306 and 308, as by welding, screws, or the like.

The forward end portion of the side section 308 of the lower inner guide support extends inwardly of the forward end portion 314 of an arcuate inner forward end guide support section 315 movably supported on the sprocket ring 230 by means of rollers 316 rotatably secured to the angle-shaped section 315 by bolts 317. The forward end portions 314 and 320 of the forward end section 315 are mounted by screws on brackets 321 and 322, respectively, which in turn are rigidly secured by bolts to the vertical flanges of the longitudinal members 205 and 204, respectively, of the carriage 200.

An upper inner guide support 325 which is similar to the inner guide section 305 includes a side section 326 whose forward portion extends slightly inwardly of the side end portion 320 of the arcuate forward end section 315, an arcuate rear end section 327, which is substantially identical with the arcuate end section 307 and is supported by means of rollers 328 on the upper drive sprocket ring 96a by means of bolts 329 which are secured to the vertical flange of the end section 327, and a side section 329 which extends above the forward upper arcuate end guide sections 315 and 290 to the delivery location of the conveyor apparatus. It will be apparent the upper inner guide support 325 is thus positioned in parallel spaced relation to the upper outer guide support 286. The upper and lower inner guide sections 305 and 325 are rigidly secured in proper vertical position on the vertical posts of the support frame 56 by means of suitable clamp assemblies.

Tht support frame 56 includes a delivery frame 350 having upper bearing plates 351 and 352 which are rigidly secured by bolts or other suitable means to the forward end portions of the side guide support sections 289 and 329, respectively, a pair of lower bearing plates 354 and 355, and a pair of angle members 356 and 357, the angle member 356 extending between and being secured to the bearing plates 351 and 354, and the angle members 357 extending between and being secured to the bearing plates 352 and 355. The lower bearing plates at their forward portions are supported by posts 358 and 359 rigidly secured thereto by suitable clamp assemblies while their rear portions are secured to horizontal side channel members 361 and 362 of the support frame 56. The outer side channel member 361 is rigidly secured to vertical posts 170 and 364 while the other side channel member 362 is rigidly secured to the vertical posts 169 and 365 of the support frame. An upper shaft 370 is rotatably mounted by means of suitable bearings 371 on the upper bearing plates 351 and 352 and a lower shaft 375 is similarly mounted on the lower bearing plates by suitable bearings 376. The upper shaft has a pair of support discs 381 and 382 and a central sprocket 383 rigidly secured thereto. Similarly, the lower shaft 375 has a pair of support discs 386 and 387 and a sprocket 388 rigidly secured thereto.

The lower movable carriage 200 which carries the lower sprocket ring 230a has laterally outwardly extending members 391 to which is rigidly secured by bolts or the like an arcuate support member 393 whose forward end portion 394 extends inwardly of the rear end portion of the side channel member 361, and an inner arcuate support member 395 whose forward end portion 396 extends inwardly of the channel member 362. The other forward end portions 394a and 396b of the support members 393 and 395 extend between the forward end portions of increased height of the side sections 306 and 307. The arcuate support members 393 and 395 are positioned below the lower sprocket ring.

The side sections 271 and 306 of the guide supports 270 and 271 at their forward ends support a shaft 395 by means of suitable bearings 396. The shaft 395 is provided with a pair of support discs 396 and 397 and a sprocket 398.

The parallel side sections of the horizontally aligned guide supports are rigidly secured to one another by transverse rods 400 on which are mounted inner and outer support ribs 401 and 402 respectively, which extend parallel to the side sections and are provided at their upper ends with beads or strips 404 of a suitable somewhat resilient substance having a low coefficient friction, such as "Teflon," "nylon," or the like. The arcuate end sections 273, 288 and 290 of the guide supports each have a vertical arcuate support rib 419 rigidly secured thereto by means of bolts 411, which extend through suitable tubular spacers 412 disposed between the webs of the arcuate end sections and the support members 410, and nuts 413 threaded on the bolts. The support members are provided with a top cover or bead 414 of Teflon, nylon or the like, which is secured thereto in a suitable manner, as by adhesive bonding or the like. The support ribs of the various guide support sections of the conveyor apparatus preferably overlap to provide a linearly continuous line of support for the conveyor 54 adjacent its outer ends. The horizontal flanges of the inner guide supports 307, 315, and 322 support the inner end portions of the conveyor as it moves thereabout.

The conveyor 54 includes an endless draw member 450 formed of a plurality of pivotally connected inner and outer link assemblies 451 and 452. Each of the inner link assemblies includes a pair of link plates 453 and 455 which are rigidly connected to one another by a pair of tubular connectors 456 whose outer end portions extend through aligned apertures in the link plates and are rigidly secured thereto in any suitable manner, as by swedging the outer end portions thereof. Tubular rollers 458 are rotatably mounted on the tubular connector members between the link plates. Each of the outer link assemblies includes a pair of link members 460 and 461 whose vertical flanges 462 and 463, respectively, are disposed outwardly of and overlap adjacent end portions of adjacent link plates 453 and 455 respectively, of adjacent inner link assemblies 451 and are secured thereto by pins 464.

The pins extend through aligned apertures in the vertical flanges 462 and 463 and the tubular connectors 456. The pins 464 have reduced end portions 466 which provide annular shoulders 467 which limit inward movement of the vertical flanges of the outer link members 460 toward one another on the pins. The outer ends of the pins are peaned to rigidly secure vertical flanges of the link members 460 and 461 of each outer link assembly to one another. The inner link assemblies 451 are thus secured to the outer link assemblies for pivotal movement about the axes of the pins 464. The inner surfaces of the vertical flanges of the outer link members 460 and 461 being spaced from the outer surfaces of the link plates 453 and 455, respectively, and the connector pins 464 being of smaller diameter than the internal diameters of the tubular connectors 456, each inner link assembly is pivotally movable relative to the outer link assemblies which are connected thereto about axes perpendicular to the longitudinal axes of the connector pins 464 which extend through its tubular connectors 456 and also about axes perpendicular to the longitudinal axes of the connector pins. The draw member 450 is thus double articulated and can curve or flex about vertical axes as it moves about the various sprocket rings mounted on the drive frame and on the movable carriages and may also flex about horizontal axes as it moves about the sprockets 383, 388 and 398. The teeth of these sprockets are of course received between the adjacent rollers 458 of the inner link assemblies, the rotary movement of the tubular rollers decreasing the friction between the sprockets and the draw member.

The link members 460 have upper and lower horizontal flanges 470 and 471 provided with pairs of aligned apertures 472 and 473, respectively. The end connector sections 474 of substantially U-shaped rod members 475 extend through the apertures of the horizontal flanges of every other link member. The rod members have parallel body sections 476 and 477 which extend inwardly to the draw member from the bight or connector sections 478 thereof and from whose inner ends the connector sections extend perpendicularly. The support rods are preferably formed of a resilient wire or rod so that the dependent connector sections 474 thereof may flex resiliently as required during their insertion through the apertures 472 and 473 of the horizontal flanges 470 and 471.

The upper and lower horizontal flanges 480 and 481 of the link members 461 are similarly provided with pairs of vertically aligned apertures 482 and 483, respectively, through which extend the dependent connector sections 484 of the substantially U-shaped support rods 485 whose horizontal sections 486 and 487 extend inwardly to the draw member from their outer bight sections 488. The apertures 472 and 473 are offset from the apertures 482 and 483 so that the inner end portion of the section 476 of the support rod 475 is interposed between the inner end portions of the horizontal sections 486 and 487 of the support rod 485 connected to the same outer link assembly.

A convoluted or zig-zag shaped support member 490 rests upon and is secured to each support rod 475, as by spot welding, with its opposite bight portions 491 and 492 defining the outer ends of its convolutions being spaced outwardly of the support rod. The bight portions 491 of the support member 490 on one support rod 475 extend between the bight portions 492 of the support member of the next adjacent rod 475 so that the convoluted support members on the rods 475 provide a support on which even articles or objects of smaller dimension than the distance between the horizontal sections 476 and 477 of the adjacent support rods will be supported thereby. The support rods 485 similarly each have a convoluted supported member 495 resting thereon and rigidly secured thereto, as by spot welding, with their bight portions 496 and 497 defining the outer ends of the convolutions being spaced outwardly of the horizontal sections 486 and 487 of the support rod. The bight or bend portions 496 of the support member 495 on one support rod 485 extend between the bight portions 497 of the support member 495 of the next adjacent support rod 485. The width of the convolutions, or the distance between the bight portions 491 and 492, of the support members 490 may be greater than the distances between the bight portions 496 and 497 of the support members 495 when the conveyor is moved in such directions about the sprocket rings that the support rods 485 extend from the draw member toward the central axes of the sprocket rings. The greater degree of overlap or intermesh of the convolutions of the support members 475 which extend outwardly of the sprocket rings prevent any unduly large gaps developing between the support members as the outer ends of the support rods 475 are moved away from one another during the movement of the conveyor about the sprocket rings.

In the conveyor 54 illustrated in the drawings, every fifth outer link assembly 452 of the draw member has a laterally outwardly extending lug 500 secured to its link member 560 by the connector sections 474 of the support rod 475 which is connected thereto. The inner portion of the lug which extends between the horizontal flanges 470 and 471 of the connector member 460 is provided with vertical apertures 501 which are aligned with the apertures of the horizontal flanges and through which the connector sections extend. The thickness of the lug 500 is substantially equal to the distance between the facing surfaces of the horizontal flanges so that the lug is rigidly secured to the link member.

The drive lug has vertical outwardly convergent side surfaces 504 and 505, respectively, to facilitate its entry into the slots or apertures 120 between the sprocket lugs 110 on the various sprocket rings. The side surfaces 504 of the drive lugs are engageable by the end surfaces 121 of the sprocket lugs 110 of the drive sprocket rings 96a and 96b secured to the drive frame to cause the conveyor to be moved by the drive frame 85 as it rotates while their other side surfaces 505 are engageable with the shoulders 120 of the lugs 110 mounted on the sprocket rings 230 and 230a carried by the movable carriages to cause the sprocket rings 230 and 230a to rotate therewith as the conveyor is moved in its closed path by the drive frame.

Figure 16:
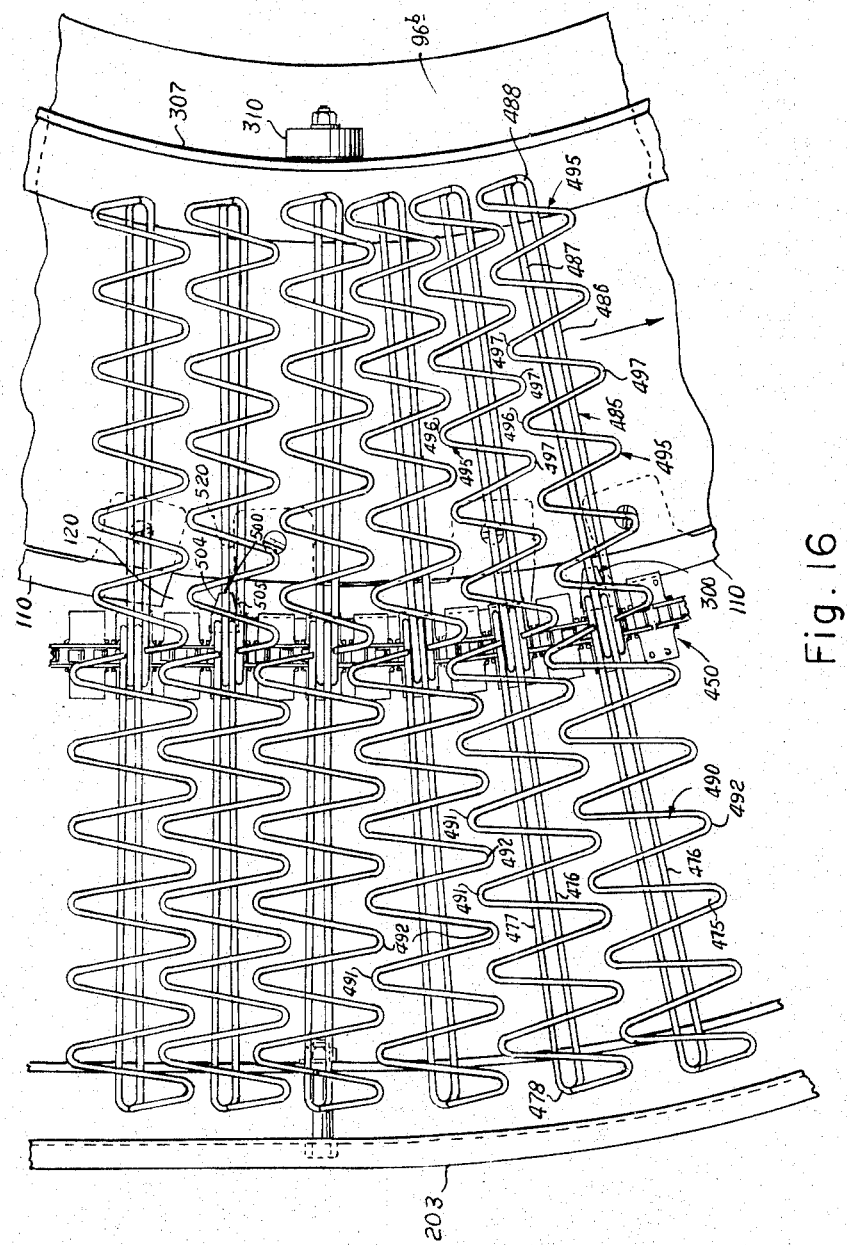
FIGURE 16 is a fragmentary plan view showing a portion of the conveyor and one of the sprocket rings of the drive frame.

As is shown in FIGURES 16 and 17, the width of the draw member drive lugs 500 is substantially smaller than the width of the slots 122 defined by the adjacent shoulders 120 and 121 of adjacent sprocket lugs 110 on each sprocket ring so that, as each outer link assembly provided with a drive lug 500 moves toward tangential alignment with the sprocket lugs of the sprocket rings 96a and 96b, the drive lug thereof enters into the forward portion of the slot 122 wherein its shoulder 505 is very closely adjacent to or is in engagement with the shoulder 120 and thus drive lugs easily enter into slots 122. The outer peripheral portions of the sprocket lugs move between the upper and lower horizontal flanges 470 and 471 of the link members 460 which are not provided with the drive lugs 500. The outward convergence of the top and bottom surfaces 116 and 117 of the drive lugs facilitates their entry between the horizontal flanges and the positioning of the outer portions of the sprocket lugs between the upper and the lower horizontal flanges helps support and hold the draw member in proper alignment and position relative to the drive sprocket rings as they rotate and move the draw member and therefore the conveyor.

At any one time, only one drive lug 500 is engaged by the sprocket lug of a drive sprocket ring 96, for example, assuming that the sprocket lug 110a engages the drive lug 500a, the sprocket ring 96a will then move the drive lug 500a, and therefore the draw member through an angle of approximately 16⅓ degrees and at this time due to the forward movement of the drive lug 500a, it will move out of engagement with the shoulder 121 of the sprocket lug 110a. At the time the sprocket shoulder 121 of the sprocket lug 110a moves out of engagement with the drive lug 500a, the shoulder 121 of the next sprocket lug 110b is still spaced from the next drive lug 500b of the draw member and the sprocket will then rotate relative to the draw member, and relative to all of the drive lugs which are disposed in the slots 122 between the sprocket lugs, through a very small angle until the shoulder 121 of the next lug 110b engages the next drive lug 500b. The shoulders 121 of each of the other sprocket lugs also move the same angular distance toward the drive lugs which are disposed in the slots.

The engagement of the drive lugs of the draw member rotates the sprocket rings 230 and 230a. As each of the drive lugs moves toward tangential alignment with the drive lugs 110 of the sprocket 230 it enters into a slot 122 between the sprocket lug in such position therein that its side surface 504 is close to the shoulder 120 of a sprocket lug 110. When the drive lugs such as the drive lug 500c (FIGURE 10) moves into engagement with the shoulder 121 of a sprocket lug 110c the sprocket ring 230 is rotated through an angle of substantially 16⅓ degrees. When the drive lug 500c moves out of engagement with the shoulder 121 of the sprocket lug 110c, the draw member will slide slightly about the sprocket ring until the next drive lug 500d engages the shoulder 121 of the next sprocket lug 110d and this drive lug will then again rotate the sprocket ring. The sprocket ring 230a of the lower movable carriage is similarly rotated by the draw member as it moves thereabout.

It will thus be apparent that at any one time, only one drive lug of the draw member is in engagement with a sprocket lug of a particular sprocket ring. The provision of such drive lugs whose widths are substantially smaller than the widths of the slots between adjacent shoulders of adjacent sprocket lugs facilitates entry of the drive lugs into the slots between the sprocket lugs and permits relatively large tolerances of the dimensions of the components of the draw member which is of great advantage not only in the assembly of the apparatus but also in its operation where the apparatus may be subjected to the wide variations of temperature or loads.

The conveyor apparatus includes means for de-energizing the motor 125 and stopping movement of the conveyor whenever the tension in any of the sections of the conveyor moves out of a predetermined range to prevent damage to the apparatus. This protective means includes an actuator rod 520 rotatably pivoted on the front frame assembly by means of suitable sockets 521 secured to the front frame assembly. The actuator rod has a radially outwardly extending arm 526 which extends transversely over the longitudinal member 201 of the upper carriage which is engageable by the vertical upwardly extending leg 527 of a bracket 528 whose foot 529 rigidly is secured to the top horizontal flange of the longitudinal member 201 by means of a bolt 530 which extends upwardly through a suitable aperture in the horizontal flanges and an elongate slot 531 of the foot 529. The vertical leg 527 engages the upper arm 526 of the operator rod when the tension in the portions of the conveyor between the sprocket ring 230 and the sprocket rings 96a and 96b increases and the movable carriage 200 moves rearwardly and rotates the actuator rod in a clockwise direction as seen from above. If the tension of the portions of the conveyor between the lower sprocket ring 230a and the sprocket rings 96a and 96b decreases, the lower movable carriage 200a moves forwardly and the vertical leg 527a of a bracket 528a, similar to the bracelet 527, mounted in its longitudinal member 201a engages the lower arm 526a of the actuator rod and rotates it in a clockwise direction. The actuator rod has an arm 530 adjacent its upper end which engages a switch 535 mounted on the front frame assembly to open the switch. A second actuator rod 540 which is also rotatably mounted by means of suitable sockets 541 secured to the front frame assembly has upper and lower arms 546 and 546a which extend transversely over the other longitudinal members 202 and 202a of the upper and lower movable carriages, respectively. The upper arm 546 is engageable by the vertical leg 547 of a bracket 548 whose foot 549 is secured to the horizontal flange of the longitudinal member 201 by means of a bolt 550 which extends through suitable apertures in the horizontal flange and an elongate slot of the foot. It will be apparent that the upper arm 546 of the actuator rod will be engaged by the leg 547 and the rod rotated in a clockwise direction when the tension in the portions of the conveyor between the sprocket rings of the drive frame and the sprocket ring 230 decreases and the carriage 230 moves forwardly. The vertical leg 547a of the bracket 548a mounted on the horizontal flange of the longitudinal member 202a of the lower movable carriage will engage the lower arm 546a of the actuator rod 540 and rotate the rod in a clockwise direction when the tension in the sections of the conveyor between the lower sprocket ring 230a and the sprocket rings 96 of the drive frame increases and the lower movable carriage 230a moves forwardly.

The actuator rod 540 has an upper arm 542 which engages and opens a switch 555 mounted on the front frame assembly when the actuator rod is rotated in a clockwise direction. The two actuator rods are biased to a neutral position wherein their upper arms do not hold open the switches by the springs of the switches which hold the operator arms or members of the switches in their inoperative positions. The switches 535 and 555 are connected in series with the winding 558 of a contactor 560, preferably of the manually resettable type, whose contacts 561, 562 and 563 connect the three phase motor 125 to the three phase alternating current input circuit 565 when the three contact master switch 566 is closed and the contactor winding 558 is energized. The switches 535 and 555 when closed connect the contactor winding across two conductors 568 and 569 of the three input conductors 568, 569 and 570 which are connected to the input circuit 565 by the master switch.

In use, if it is desired that certain objects or articles such as meat patties, bread or the like be subjected to predetermined conditions, such as a high or low temperature, for a predetermined period of time, such conditions are established in the chamber 52 by suitable cooling or heating means, not shown. The walls of the housing 51 are of course insulated to minimize the transfer of heat between the chamber and the exterior thereof. The motor 125 is energized by closing the master switch 566 and the drive frame is rotated in a counterclockwise direction as seen from the above. As the drive frame rotates, the sprocket lugs on the upper and lower sprocket rings 96a and 96b engage the drive lugs of the draw member in the manner described above and move the conveyor in a closed continuous path as indicated by the arrows in FIGURES 2 and 3 of the drawings. The objects to be subjected to the predetermined conditions are deposited on the portion 601 of the conveyor between the front wall of the housing and the sprocket 398. The portion of the conveyor moving rearwardly from the sprocket 398 and the support discs 396 and 397 secured to the shaft 395 to the lower drive sprocket ring 96b of the drive frame moves between the lower outer and inner guides 270 and 306 and is supported on the support ribs 401 and 402 thereof, its support rods sliding on the beads 404. The conveyor moves first between the side sections 271 and 306, then between the outer and inner arcuate sections 273 and 307 as its draw member is engaged by the sprocket lugs 110 secured to the lower sprocket ring 96b, and then between the side sections 274 and 308. The conveyor then moves forwardly between the outer and inner arcuate end sections 290 and 315 and about the sprocket ring 230 to the side sections 287 and 326 of the upper guide supports 286 and 325, respectively. As the draw member engages the sprocket lugs of the upper sprocket ring 230, it rotates the sprocket ring and then moves rearwardly between the side sections 287 and 326 of the upper guide supports to and about the upper sprocket ring 96a, its drive lugs are engaged by the lugs of the upper sprocket ring 96a which move it forwardly between the side sections 289 and 386 and over the upper movable carriage. The conveyor is moved forwardly through a suitable aperture in the front wall of the housing. The conveyor then moves forwardly and downwardly as it moves over the sprockets and support discs of the shaft 370 to the support discs and sprocket of the lower shaft 375 and the articles which are carried by the conveyor are removed from the conveyor during its movement between these locations. If desired, the objects could be permitted to fall off the conveyor as its direction of movement changes as its passes about the discs and sprocket on the shaft 375. The conveyor is supported during its downward and forward movement between the sprocket and support discs of the upper and lower shafts 370 and 375 by the engagement of the outer end portions of its support rods with the horizontal inwardly extending flanges of the side members 356 and 357. After moving about the sprockets and the support discs of the shaft 375, the conveyor moves rearwardly back into the chamber, through a suitable aperture in the front wall of the housing, between the side channel members 361 and 362 to and about the lower sprocket ring 230a, and then moves forwardly from the lower sprocket ring to the support discs and sprocket on the shaft 395.

It will now be apparent that the conveyor, after moving into the chamber 52, moves in a path formed of two vertical loops, then moves forwardly out of the chamber to deliver the objects carried thereby and then moves about the lower sprocket ring and back to the load-on portion of its path of movement.

It will be apparent that the length of path of travel of the conveyor in the chamber may be increased by adding additional drive sprockets on the drive frame in which case additional movable carriages, above the upper movable carriage 200, would be mounted on the front frame assembly of support frame 156 so that as many vertically spaced loops may be provided as are required to increase the period of time.

Referring now particularly to FIGURE 21 of the drawing, as the conveyor moves over the support discs and sprocket 383 of the upper shaft 370 and one outer link assembly, as such outer link assembly 452a, begins to move downwardly about the sprocket, the rear ends of its convolutions of its support members move upwardly out of horizontal alignment with the convolutions of the support members of the outer link assembly 452b, thus causing any article carried by the support members to be tilted upwardly relative to both support members. In the event such article has adhered to the support members, it is dislodged from such adhesive engagement and can then be readily removed from the conveyor as it moves to its delivery location 290.

It will also be apparent that the simultaneous driving of all loops of the conveyor by lugs of the sprocket rings mounted on the drive frame insures a uniform movement of all loops of the conveyor and that the single front frame assembly 150 supports as many vertically spaced movable carriages as are required by the number of loops of the path of travel of the conveyor.

It will further be seen that the conveyor has a draw member provided with laterally outwardly extending support rods each provided with convoluted support members which intermesh or overlap so that only every other outer link assembly of the draw member is required to carry such support rods and articles of relatively small dimensions may be carried by the conveyor.

It will also be seen that the lugs 114 of the sprocket rings are secured to the sprocket means by means which permits their radial adjustment on the sprocket rings so that the effective diameter of the sprocket rings and lugs, i.e., the location of engagement of the draw member with the lugs may be adjusted as required as the draw member elongates with use and wear.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. A conveyor apparatus including: a support frame having rear and front support assemblies; a drive frame mounted on said rear assembly for rotation about a vertical axis; means for rotating said drive frame; a plurality of vertically spaced sprocket means rigidly mounted on said drive frame; a movable carriage mounted on said front support assembly for linear movement toward and away from said drive frame; sprocket means mounted on said carriage for rotation about a vertical axis; and a conveyor arranged in a plurality of vertically spaced loops about said drive frame and carriage sprocket means, said conveyor including an endless draw member articulated at longitudinally spaced locations for movement about mutually perpendicular axes, said drive frame sprocket means engaging said draw member at each of said loops of said conveyor for moving said loops of said conveyor, said draw member engaging said carriage sprocket means to rotate said carriage sprocket means, said sprocket means having a plurality of circumferentially spaced radially outwardly extending lugs having outwardly convergent side surfaces, said side surfaces of adjacent sprocket lugs defining circumferentially spaced slots of said sprocket means, said draw member having longitudinally spaced laterally outwardly extending drive lugs receivable in said slots of said sprocket means, said drive lugs being of lesser width than said slots of said sprocket means, the spacing of said drive lugs of said draw member relative to one another and the spacing of said sprocket lugs relative to one another causing only one lug of said sprocket means to be engaged with a drive lug of said draw member at any one time, each of said sprocket means and the portion of said draw member engaged thereby moving relative to one another as a drive lug engaged by a sprocket lug moves out of engagement therewith to cause the next drive lug and the next sprocket lug to engage to cause further simultaneous movement of the sprocket means and the portion of the draw member engaged thereby.

2. The conveyor system of claim 1 wherein each of said sprocket means includes a substantially planar member, a plurality of circumferentially spaced radially outwardly extending lugs, and means rigidly securing said lugs to said planar member in linearly radially adjustable position relative to said planar member.

3. The conveyor apparatus of claim 2 wherein said sprocket lugs have upper and lower outwardly convergent surfaces and outwardly convergent side surfaces, said side surfaces of adjacent lugs defining circumferentially spaced slots of said sprocket means.

4. The conveyor apparatus of claim 1 wherein said draw member has vertically spaced radially outwardly extending flanges engageable by radially outer portions of said sprocket lugs which are receivable therebetween whereby said draw member is supportable by said sprocket lugs.

5. A conveyor apparatus including: a support frame having rear and front support assemblies; a drive frame mounted on said rear assembly for rotation about a vertical axis; means for rotating said drive frame; a plurality of vertically spaced sprocket means rigidly mounted on said drive frame; a movable carriage mounted on said front support assembly for linear movement toward and away from said drive frame; sprocket means mounted on said carriage for rotation about a vertical axis; a conveyor arranged in a plurality of vertically spaced loops about said drive frame and carriage sprocket means, said conveyor including an endless draw member articulated at longitudinally spaced locations for movement about mutually perpendicular axes, said drive frame sprocket means engaging said draw member at each of said loops of said conveyor for moving said loops of said conveyor, said draw member engaging said sprocket means to rotate said carriage sprocket means; and means yieldably biasing said movable carriage to maintain the loops of said conveyor under predetermined tension, each of said sprocket means including a substantially planar member, a plurality of circumferentially spaced radially outwardly extending lugs, and means rigidly securing said lugs to said planar member in linearly radially adjustable positions relative to said planar member, said sprocket lugs having upper and lower outwardly convergent surfaces and outwardly convergent side surfaces, said side surfaces of adjacent lugs defining circumferentially spaced slots of said sprocket means, said draw member having longitudinally spaced laterally outwardly extending drive lugs, said drive lugs being of lesser width than said slots of said sprocket means, the spacing of said drive lugs from one another and the spacing of said sprocket lugs relative to one another causing only one lug of each of said sprocket means to be in engagement with a drive lug of said draw member at any one time, said draw member having vertically spaced radially outwardly extending flanges engageable by radially outer portions of said sprocket lugs which are receivable therebetween whereby said draw member is supportable by said sprocket lugs, said conveyor including a plurality of support rods rigidly secured to said vertically spaced flanges of said draw member and extending laterally outwardly thereof in opposite directions, and support members secured to said support rods and having convolutions which extend longitudinally of said draw member, convolutions of adjacent support members on each of side of said draw member intermeshing.

6. The conveyor apparatus of claim 5, and support means mounted on said support frame and extending on opposite sides of said draw member engaged by said support rods for supporting said conveyor.

7. A conveyor apparatus including: a support frame having rear and front support assemblies; a drive frame mounted on said rear assembly for rotation about a vertical axis; means for rotating said drive frame; a plurality of vertically spaced sprocket means rigidly mounted on said drive frame; a movable carriage mounted on said front support assembly for linear movement toward and away from said drive frame; sprocket means mounted on said carriage for rotation about a vertical axis; a conveyor arranged in a plurality of vertically spaced loops about said drive frame and carriage sprocket means, said conveyor including an endless draw member articulated at longitudinally spaced locations for movement about mutually perpendicular axes, said drive frame sprocket means engaging said draw member at each of said loops of said conveyor for moving said loops of said conveyor, said draw member engaging said sprocket means to rotate said carriage sprocket means; and means yieldably biasing said movable carriage to maintain the loops of said conveyor under predetermined tension; said conveyor including a plurality of support rods rigidly secured to said draw member and extending laterally outwardly thereof in opposite directions, and support members secured to said support rods and having convolutions which extend longitudinally of said draw member, convolutions of adjacent support members on each side of said draw member intermeshing.

8. A conveyor apparatus including: a support frame having front and rear support assemblies; a drive frame mounted on said rear support assembly for rotation about a vertical axis; a plurality of vertically spaced sprocket means rigidly secured to said drive frame; a drive means for rotating said drive frame; a plurality of vertically spaced carriages mounted on said front support assembly for independent linear movement toward and away from said rear support assemblies; a sprocket means rotatably mounted on each of said carriages; first and second conveyor direction changing means disposed forwardly on opposite sides of said carriages; a conveyor arranged in a plurality of vertically spaced loops about said sprocket means of said drive means and said carriages, the forward end portion of the uppermost loop traveling forwardly at one side of said carriages to and about said first direction changing means and then rearwardly to and about the lowermost of said carriages, the conveyor moving from said lowermost sprocket means forwardly and to and about the second direction changing means and then upwardly and rearwardly to the lowermost of said drive frame sprocket means; and separate means associated with each of said movable carriages yieldably biasing said lowermost of said movable carriages rearwardly toward said drive frame and the others of said carriages forwardly to maintain all portions of said conveyor under predetermined tension, said conveyor including a draw member, said draw member and said sprocket means having coengageable lugs for causing said drive frame sprocket means to move the conveyor at each of said loops thereof and coengageable with said carriage sprocket means for rotating said carriage sprocket means as said conveyor moves thereabout, said sprocket lugs being radially adjustable to provide for adjusting the effective diameter of said sprocket means, said conveyor including a plurality of laterally outwardly extending support rods secured to said draw member and convoluted support members secured to said support rods, adjacent convolutions of adjacent support members intermeshing.

9. In a conveyor apparatus, a sprocket means including; a planar member having a substantially circular outer edge surface, a plurality of lugs; and means rigidly securing said lugs to said planar member in circumferentially spaced relationship and in radially adjustable positions relative to said planar member, said lugs having outer portions extending radially outwardly of said edge surface, said outer portions of said lugs having upper and lower radially outwardly convergent surfaces and outwardly convergent side surfaces whereby adjacent side surfaces of adjacent lugs define circumferentially spaced outwardly opening slots of said sprocket means; and a conveyor including a draw member disposed about said sprocket means; a plurality of laterally outwardly extending drive lugs secured to said draw member at longitudinally spaced locations therealong and receivable in said slots, said lugs having outwardly convergent side surfaces, said drive lugs being of lesser width than said slots of said sprocket means, the spacing of said drive lugs of said draw member relative to one another and the spacing of said sprocket lugs of each of said sprocket means relative to one another causing only one lug of each sprocket means to be engaged with a drive lug of said draw member at any one time, each of said sprocket means and the portion of said draw member engaged thereby moving relative to one another as a drive lug engaged by a sprocket lug of the sprocket means moves out of engagement therewith to cause the next drive lug of the draw member and the next sprocket lug of the sprocket means to engage to cause further simultaneous movement of the sprocket means and the portion of the draw member engaged thereby.

10. The apparatus of claim 9, wherein said draw member comprises a plurality of longitudinally spaced outer link assemblies and a plurality of inner link assemblies, each liner link assembly connecting an adjacent pair of outer link assemblies at longitudinally spaced locations for pivotal movement, said inner and outer link assemblies being pivotable relative to each other about mutually perpendicular axes, said outer link assemblies having laterally outwardly extending horizontally spaced flanges, said outer portions of said lugs of said sprocket means being receivable between said flanges of said outer link assemblies to support said draw member.

11. In a conveyor apparatus: a sprocket means including a planar member having a substantially circular outer edge surface, a plurality of lugs, and means rigidly securing said lugs to said planar member in circumferentially spaced relationship and in linearly radially adjustable positions relative to said planar member, said lugs having outer portions extending radially outwardly of said edge surface, said outer portions of said lugs having upper and lower radially outwardly convergent surfaces and outwardly convergent side surfaces whereby adjacent side surfaces of adjacent lugs define circumferentially spaced outwardly opening slots of said sprocket means; and a conveyor including a draw member disposed about said sprocket means, a plurality of laterally outwardly extending drive lugs secured to said draw member at longitudinally spaced locations therealong and receivable in said slots, said lugs having outwardly convergent side surfaces, said drive lugs being of lesser width than said slots of said sprocket means to cause only one of said drive lugs at any one time to be engaged by a side surface of a lug of said sprocket means, said draw member comprising a plurality of longitudinally spaced outer link assemblies and a plurality of inner link assemblies, each inner link assembly connecting an adjacent pair of outer link assemblies at longitudinally spaced locations for pivotal movement, said inner and outer link assemblies being pivotable relative to each other about mutually perpendicular axes, said outer link assemblies having laterally outwardly extending horizontally spaced flanges, said outer portions of said lugs of said sprocket means being receivable between said flanges of said outer link assemblies to support said draw member, said conveyor including a plurality of support rods extending in laterally opposite directions relative to said draw member, said support rods having dependent leg portions secured to said flanges of said outer link assemblies; and support members on said support rods and having convolutions which extend longitudinally of said draw member and perpendicularly to said support rods, convolutions of each support member intermeshing with convolutions of support members secured to support rods adjacent each support member.

12. The apparatus of claim 11, wherein said drive lugs extend between said horizontally spaced flanges of selected ones of said outer link assemblies, said drive lugs and said flanges having aligned vertical apertures, and wherein said conveyor includes a plurality of substantially U-shaped support rods, said support rod having dependent free end portions extending through said apertures in said drive lugs and said flanges to rigidly secure said support rods and said drive lugs to said draw member, said support rods extending laterally outwardly of said draw member.

13. The apparatus of claim 12, wherein support members are secured on said support rods and having convolutions which extend longitudinally of said draw member and perpendicularly relative to said support rod, convolutions of a support member on each support rod intermeshing with convolutions of support members of support rods adjacent each support rod.

14. In a conveyor apparatus, a conveyor including: a draw member comprising a plurality of inner and outer link assemblies, each inner link assembly extending between and being connected at longitudinally spaced locations thereof to adjacent outer link assemblies, said inner and outer link assemblies being pivotable relative to each other about perpendicular about horizontal and vertical axes at said locations of their connection to one another, each of said outer link assemblies having a pair of horizontal vertically spaced flanges at each side thereof extending outwardly from said draw member, said horizontal flanges of at least some of said outer link assemblies being provided with aligned perpendicular apertures therein; a plurality of horizontal support rods extending laterally outwardly of said draw member and having dependent inner leg portions, said support rods being secured to said horizontal flanges by means of said dependent lag portions which extend through said aligned apertures of said horizontal flanges, preselected ones of said outer link assemblies having drive lugs secured thereto and extending laterally outwardly from said draw member, said drive lugs having inner portions extending between said spaced horizontal flanges of said outer link assemblies and having vertical passages aligned with said apertures of said horizontal flanges, said dependent leg portions extending through said apertures and said passages to secure said drive lugs to said draw member.

15. In a conveyor apparatus, a conveyor including: a draw member comprising a plurality of inner and outer link assemblies, each inner link assembly extending between and being connected at longitudinally spaced locations thereof to adjacent outer link assemblies, said inner and outer link assemblies being pivotable relative to each other about perpendicular horizontal and vertical axes at said locations of their connection to one another, each of said outer link assemblies having a pair of horizontal verticaly spaced flanges at each side thereof extending outwardly from said draw member, said horizontal flanges of at least some of said outer link assemblies being provided with aligned perpendicular apertures therein; a plurality of horizontal support rods extending laterally outwardly of said draw member and having dependent inner leg portions, said support rods being secured to said horizontal flanges by means of said dependent leg portions which extend through said aligned apertures of said horizontal flanges, preselected ones of said outer link assemblies having drive lugs secured thereto and extending laterally outwardly from said draw member, said drive lugs having inner portions extending between said spaced horizontal flanges of said outer link assemblies and having vertical passages aligned with said apertures of said horizontal flanges, said dependent leg portions extending through said apertures and said passages to secure said drive lugs to said draw member; and convoluted support members on said horizontal support rods, said support members having longitudinally extending convolutions, convolutions of a support member on one support rod intermeshing with the convolutions of support members on adjacent support rods.

16. The apparatus of claim 15, wherein said support rods have substantially parallel sections, and connector sections connecting ends of said parallel remote from said draw member, said dependent leg portions extending angularly from ends of said parallel sections at said draw member.

17. The apparatus of claim 16, wherein said drive lugs have vertical outwardly convergent sides receivable in outwardly opening circumferentially spaced slots of a sprocket means about which said draw member is disposable, said drive lugs being of substantially smaller width than said slots.

18. A conveyor for use in a conveyor apparatus having a plurality of spaced sprocket means, said conveyor including: an endless draw member articulated at longitudinally spaced locations for movement about mutually perpendicular axes and disposable in loops about the sprocket means of a conveyor apparatus, said draw member having a plurality of support rods rigidly secured to said draw member and extending laterally outwardly thereof in opposite directions; and separate support members secured on and to said support rods and having convolutions which extend longitudinally of said draw member, convolutions of adjacent support members on each side of said draw member intermeshing, said support members extending the lengths of said support rods.

19. The apparatus of claim 18, wherein said draw member has drive lugs rigidly secured thereto and extending laterally outwardly therefrom, said drive lugs having vertical outwardly convergent side surfaces engageable with the sprocket means of a conveyor apparatus.

References Cited

UNITED STATES PATENTS

| | | | |
|---|---|---|---|
| 412,527 | 10/1889 | Fisher | 74—224 |
| 736,906 | 8/1903 | Willson | 74—224 |
| 833,774 | 10/1906 | Clark | 198—181 |
| 1,239,077 | 9/1917 | Begg | 198—17 |
| 1,614,056 | 1/1927 | Ayars | 198—136 |
| 1,736,891 | 11/1929 | Thompson | 198—136 |
| 3,094,206 | 6/1963 | Stewart | 198—181 |
| 3,260,353 | 7/1966 | Bajulaz | 198—156 |
| 3,285,394 | 11/1966 | Lanham | 198—177 |

FOREIGN PATENTS

| | | |
|---|---|---|
| 845,024 | 7/1952 | Germany. |
| 43,221 | 4/1908 | Switzerland. |

RICHARD E. AEGERTER, *Primary Examiner.*

ANDRES H. NIELSEN, *Examiner.*